United States Patent [19]

South

[11] Patent Number: 4,635,044
[45] Date of Patent: Jan. 6, 1987

[54] FAILED FUSE DETECTOR AND DETECTING METHOD FOR ROTATING ELECTRICAL EQUIPMENT

[75] Inventor: William H. South, McKeesport, Pa.

[73] Assignee: Westinghouse Electic Corp., Pittsburgh, Pa.

[21] Appl. No.: 197,732

[22] Filed: Oct. 16, 1980

[51] Int. Cl.[4] ............................................. G08B 21/00
[52] U.S. Cl. ................................ 340/638; 310/68 D; 340/639; 363/53
[58] Field of Search ....................... 340/638, 639, 645; 310/68 R, 68 B, 68 D; 361/104; 363/50, 52, 53

[56] References Cited

U.S. PATENT DOCUMENTS 3,030,531  4/1962  Lessmann ..................... 310/68 D
3,866,196  2/1975  Mann et al. ................... 310/68 D

FOREIGN PATENT DOCUMENTS 45-23449  8/1970  Japan ................................. 340/638

*Primary Examiner*—James L. Rowland
*Assistant Examiner*—Daniel Myer
*Attorney, Agent, or Firm*—William D. Lanyi

[57] ABSTRACT

A method and an arrangement of apparatus is provided for remotely detecting the existence of a failed fuse of a brushless exciter rotor's rotating rectifier assembly. A conducting fuse produces a magnetic field which is sensed by elements on a stationary structure. A signal corresponding to the conducting status of each fuse is synchronized to the rotational speed of the brushless exciter rotor by means of a preselected oscillator frequency and the status of each individual fuse is retained and displayed until the next inspection of that fuse. Alarm circuitry enables automatic detection of a failed fuse and shutdown in the event of multiple fuse failures. Since this method looks for the instance of current through each fuse, it operates in a fail-safe manner.

7 Claims, 2 Drawing Figures

FAILED FUSE DETECTOR AND DETECTING METHOD FOR ROTATING ELECTRICAL EQUIPMENT

BACKGROUND OF THE INVENTION

The present invention relates to the selective determination of a fuse failure in situations where the fuses being monitored are fixed to a rotating device. An example of this situation is a brushless exciter used with an electrical generator. Brushless exciters typically have electrical circuits consisting of many fused diodes, the conductivity of which are important to the operation of the exciter and corresponding generator.

The basic function of a brushless exciter is to convert three phase alternating current to direct current which provides the rotating field of the alternating current turbine generator. This is accomplished by rectifying the alternating current with diode circuits mounted on the rotor of the brushless exciter. For a three phase rectifier circuit, at least six diodes are required and in situations where very high currents are anticipated, multiple diodes are applied in parallel to reduce the current in any individual diode. This procedure produces many parallel current paths within the total circuit with each path requiring a fuse to protect its associated diode.

When multiple parallel paths exist, the failure of a single fuse in one of them may not produce a sufficient overload on the components in paths parallel to it since, in exciters for large generators where a relatively large number of diodes is necessary to carry the current, an excess number of diodes is normally provided so that some predetermined number of diodes can be nonfunctional without seriously overloading the remaining functional diodes. For example, in a design where ten diodes are paralleled the failure of a single diode protecting fuse would cause an overload of approximately 11.1% in the remaining nine diodes. Design criteria would normally allow for this magnitude of overload and a machine a shutdown would not be required. However, even a single failed fuse, as described above, would necessitate an alarm notification in order that the operator be made aware that the exciter is operating under an abnormal situation and that the remaining nine diodes are operating under an overload condition. Realizing that this type of overload operation of the remaining nine diodes, although not warranting an immediate shutdown, may have a degrading effect on them, the operator may want to schedule a corrective procedure when it next becomes convenient to do so. In the event that more than one diode path becomes inoperative due to fuse or diode failure the operator may want to schedule an immediate orderly shutdown of the equipment in order to avoid serious degradation of the life expectancy of the remaining diodes. Obviously, from the above discussion, when multiple fuses fail in a given diode circuit the overloading effect on the remaining diodes may be so great that their associated fuses immediately fail, removing one complete diode circuit from operation. This type of catastrophic failure would require the immediate emergency shutdown of the system since the exciter could no longer operate properly.

Brushless exciters rotate at very high speeds. Two-pole machines operate at 3600 RPM and four-pole machines operate at 1800 RPM. Since the fuses and diodes are mounted on the circumference of the exciter's rotor, these components can travel at very high linear velocities. These velocities are well beyond a human operator's abilities to inspect the fuses visually or manually. Therefore, some form of automated equipment is required to assist the operator in determining the existence of a failed fuse or diode.

There are devices available to aid the operator in this function. One such device is disclosed in Mann et al., U.S. Pat. No. 3,866,196 which utilizes a projection tile that, upon a fuse failure, is released by a rupturing wire and centrifugally forced to move outward a short distance and extend radially from the surface of the rotor. The projectile can be later observed through the use of a stroboscopic light or other suitable means of observing the projectile. Another such device is disclosed in Lessmann U.S. Pat. No. 3,030,531 which utilizes an indicator lamp, or other similar means of gaining a visual indication of the operation of each fuse element, connected in parallel to each fuse. Upon failure of a fuse, its associated lamp is subjected to a portion of the current that is no longer able to flow through the failed fuse and the activated lamp can be visually sensed by means of a stroboscopic light or other suitable means. This Lessmann patent further contemplates the use of a transparent fuse that can be stroboscopically inspected or a relatively thin fuse wire that, like the lamp described above, is connected in parallel with each fuse. Upon the failure of a fuse, the subsequent current flowing through its associated fuse wire is sufficient to burn it apart and this parted condition is discernible by use of a stroboscopic light or similar means.

Failure of the diode circuitry can occur in ways that are not detectable by the means discussed above. These include a mechanical or electrical failure that results in an open circuit in series with a diode and its corresponding fuse. This type of failure would result in the fuse, although still in working order, having no current flowing through it. Under this failure mode the Mann projectile would not be released since a current is required to melt a retaining wire for that operation. Also, under this mode of failure, the Lessmann lamp or transparent fuse would not be subjected to the current that is required for their correct operation.

Another area where improvement can be realized is in the prevention of invalid fuse failures. These can occur when the fuse failure indicator itself fails. For example, if the projectile retaining wire in the Mann invention ruptures due to the high centrifugal forces encountered during operation, a failed fuse indication will be evidenced even though the fuse itself is operating satisfactorily. Although this type of false alarming failure is annoying and possibly costly as measured in wasted effort, a more disastrous situation occurs when the failed fuse indicator fails to operate when it should. This could happen, for example, if the lamp in the Lessmann device fails to produce light because of a broken lamp element or the Mann projectile jams or is not released due to some failure in the release wire circuit.

Furthermore, the need for a deliberate manual inspection of the failed fuse detectors described above and the requirement that the failed fuse detector be an element of the design of the rotor itself make possible a significant improvement by their elimination.

SUMMARY OF THE INVENTION

The present invention provides a means for selectively determining the conducting status of the fuses and their associated diodes of a brushless exciter rotor remotely. It requires no design alteration of the exciter rotor itself and eliminates the requirement of a deliberate visual inspection of the exciter by the operator to determine the existence of a failed fuse.

Since the diodes of the brushless exciter rotor serve to rectify an alternating current, the current flowing through any specific diode and its series-connected fuse varies greatly over time. The amount of current flowing through a diode at any given time is a function of the rotational position of the brushless exciter rotor at that particular time and the specific design of the rectifier circuits. For example, in a three phase twelve pole (six pole pair) exciter each particular diode undergoes six current carrying periods during each complete revolution of the exciter rotor. These six periods each last for 20 degrees of rotor rotation and are separated by 40 degrees of non-conducting by that particular diode. The locations of these conducting periods around the circumference of the exciter rotor can be determined for each diode or fuse from the brushless exciter design.

Remote current sensors are positioned about the circumference of the brushless exciter rotor at points where the fuses are designed to carry their highest currents. These positions vary depending on the particular fuse's position in the rectifying circuit but, as mentioned above, can be determined from the exciter design. Once determined, a fuse's current carrying position during normal operation with a generator will not change. Since the rotor is rotating at a high speed, any specific fuse will be in a position adjacent to a current sensor for only a very short period of time. Therefore the sensors must be inspected at precisely the proper time to sense a fuse's current flow when the fuse is directly under the current sensor. Otherwise, the sensor may detect the current of another fuse or sense a complete absence of current due to the lack of any conducting fuse being within its sensing range. The present invention utilizes the high speed capabilities of electronics to determine the precise time at which the proper sensor must be activated and to store the results of each sensing operation for each fuse. In order to coordinate the rotation of the exciter shaft with the activation of the sensors, a mark on the rotor shaft is used. Since most exciter rotor designs include such a mark for other purposes, this will usually not require that an additional mark be included in the rotor design. All timing measurements are made relative to each subsequent appearance of the mark proximate a mark sensor as the exciter's rotation repeatedly moves the mark past the mark sensor. All angular positions are determined relative to this mark on each rotation of the exciter rotor. The electronic equipment that makes up part of the present invention determines the fuse which is to be checked during the next rotation, chooses the proper current sensor, measures the angular rotation of the rotor and activates the chosen sensor at a time when the chosen fuse is in a position proximate that sensor. The electronic equipment further retains the results of the sensing operations so that they may be indicated on a display panel for the operator and used in an alarm circuit which detects a fuse status that indicates a lack of current flowing through it, meaning that the fuse or some component in series with the fuse is preventing the expected flow of current.

BRIEF DESCRIPTION OF THE DRAWINGS

The invention will be more fully understood from the following detailed description of the preferred embodiment, read in conjunction with the accompanying drawings, in which.

DESCRIPTION OF THE PREFERRED EMBODIMENT

Figure 1:
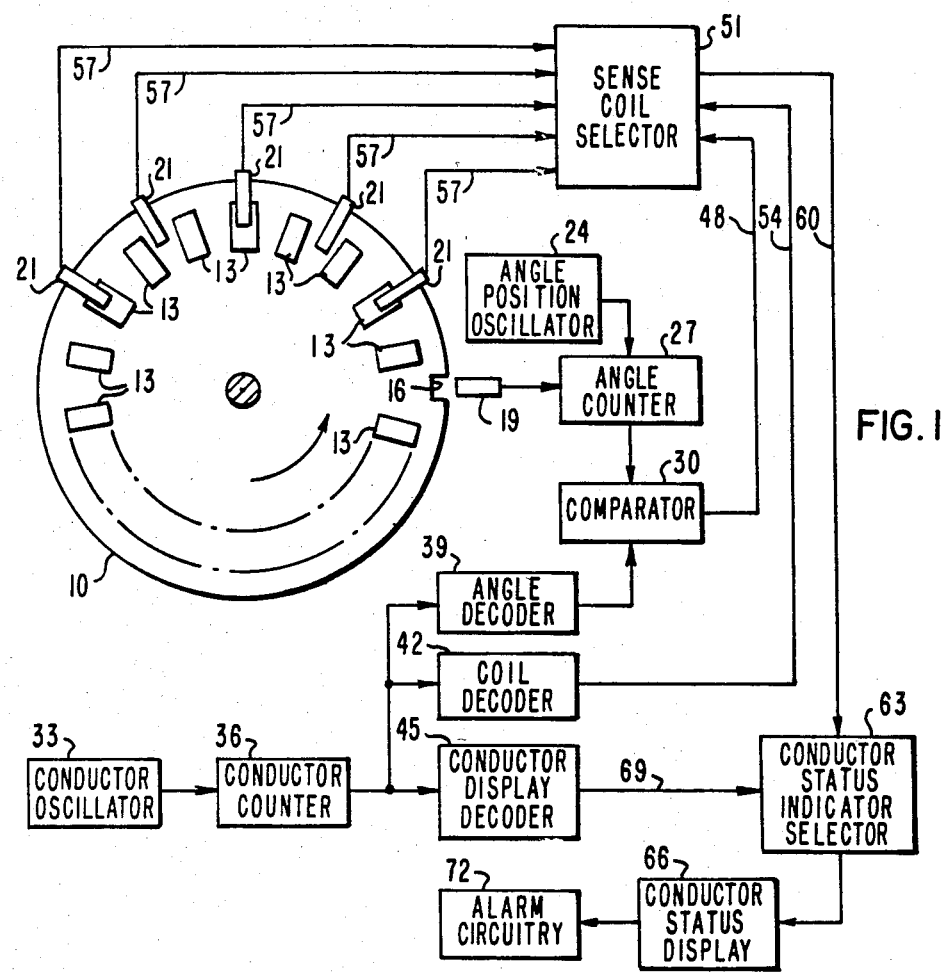
FIG. 1 is a schematic block diagram showing the failed fuse detector of the present invention.

A schematic diagram of the failed fuse detector of the present invention is shown in FIG. 1 including a cross section view of a brushless exciter rotor 10. A plurality of fuses 13 are shown rigidly attached to the rotor along its circumference. The rotor includes a mark 16 shown as an indentation, but which can be a raised portion or any other suitable mark that can be remotely sensed on each rotation of the exciter rotor 10. A mark sensor 19 is used for this purpose and is rigidly positioned in line with the circular path of the mark 16 followed during each rotation of the rotor 10. A plurality of rigidly mounted current sensors 21 are disposed about the circumference of the rotor in positions where the various fuses 13 attain their maximum currents. The required number and positions of the current sensors are determined by the design of the brushless exciter rotor. The current sensors can be of various types, any of which having the capability to remotely detect a current flow in a conductor. Typical of these types are sensors that utilize the Hall effect to sense the magnetic field caused by the flow of current through a proximate conductor and produce a proportionate signal indicating the current flow. The only requirement of these current sensors is that they make possible the remote detection of a current flow and a corresponding output signal representing the conducting status of the conductor as either conducting or non-conducting. The mark sensor 19 and the current sensors 21 are the only parts of the present invention that are required to be in close proximity to the brushless exciter rotor 10 and its fuses 13.

The operation of the current sensors 21 is coordinated to the rotation of the rotor 10 by an angle position oscillator 24 which produces a constant stream of pulses at a preselected rate. For ease of operation the frequency of these pulses can be chosen to coincide with the degrees of rotation of the exciter rotor 10. For example, if the brushless exciter rotor is designed to rotate at 3600 RPM, a frequency of 21.6 KHz would produce one pulse from the angle position oscillator 24 for every 1 degree of rotation of the brushless exciter rotor 10. Obviously any reasonable frequency of the angle position oscillator can be used, but this value was chosen because it allows for an acceptably accurate calibration procedure and is in accordance with standard angular measurement techniques which utilize 360 degrees per revolution.

The pulses from the angle position oscillator 24 cause the angle counter 27 to increment its stored counter value. This value is continuously output to a comparator 30. When the mark sensor 19 senses the mark 16 passing under its sensing head, the counter value of the angle counter is caused to be cleared to zero. Accordingly, the counter value would cyclically rise from zero to 360 and then be cleared again on each subsequent sensing of the mark 16 by the mark sensor 19. As can readily be seen, the counter value and the associated value sent to the comparator at any specific instant will be equivalent to the number of degrees of angular displacement of the rotor 10 from the reference position where its mark 16 was coincident with the mark sensor 19. This factor allows for the rotor's precise rotational position to be measured and a determination made of the occurrence of the proper angle at which a particular fuse 13 will be in position under the proper current sensor 21 for its current conducting status to be inspected.

In most brushless exciter applications it is not necessary to inspect each fuse 13 on each revolution of the rotor 10. Inspecting one fuse per revolution is satisfactory. Referring again to FIG. 1, the conductor oscillator 33 can be set to a preselectable frequency that determines the rate at which the present invention switches its attention from one fuse to the next. Each pulse from the conductor oscillator 33 causes the conductor counter 36 to increment its counter value and output this value to three mutually independent devices: the angle decoder 39, the coil decoder 42 and the conductor display decoder 45. When the counter value of the conductor counter 36 reaches the value equal to the total number of fuses to be tested it resets to unity and begins the counting over again. If the rotor 10 is rotating at 3600 RPM, a frequency of 60 Hz for the conductor oscillator 33 will result in a change of the counter value of the conductor counter 36 once for each revolution of the rotor. This frequency and its corresponding rate of fuse inspections can easily be varied to suit the requirements of the brushless exciter application.

The angle decoder 39 receives the conductor count value and, based upon a predetermined scheme, determines the proper angle of the rotor that places that particular fuse 13 under its proper current sensor 21. The angle decoder 39 can consist of electronic circuitry or a programmable read only memory microprocessor (PROM). The output from the angle decoder is an angle value and this value is an input for the comparator 30. When the comparator 30 senses an equality between the value received from the angle counter 27 and the value received from the angle decoder 39, it produces an enabling pulse on the line 48 which is one input to a sense coil selector 51.

When the conductor counter 36 sends its counter value to the angle decoder 39 as described above, it simultaneously sends the same value to the coil decoder 42. The coil decoder receives this counter value and, based upon a predetermined scheme, determines the proper current sensor 21 which is positioned in a place where that particular fuse should be carrying its maximum current. The coil decoder 42 produces a signal identifying this current sensor on the line 54 which is an input to the sense coil selector 51. The coil decoder 42 can consist of electronic circuitry or a programmable read only memory microprocessor (PROM).

The sense coil selector 51 has the ability to multiplex the many current sensor signals, which are available on lines 57, based on the value it receives on line 54 from the coil decoder 42. It performs this multiplexing function at such time that it receives an enabling pulse on line 48 from the comparator 30. The signal value that is received from the line 57 corresponding to the current sensor 21 identified by the value on line 54, as received from the coil decoder 42, is sent out from the sense coil selector 51 on line 60 to the conductor status indicator selector 63. The sense coil selector 51 can consist of electronic circuitry or a programmable read only memory microprocessor (PROM).

In order for the conductor status indicator selector 63 to properly display the status of each fuse 13 on the conductor status display 66 it receives a position signal from the conductor display decoder 45 on line 69. The counter value from the conductor counter 36 is received by the conductor display decoder 45 which, based on a predetermined scheme, determines the proper display element of the conductor status display 66 to be alterred to reflect the appropriate conducting status for the fuse represented by the counter value which was last received from the conductor counter 36. The conductor display decoder can consist of electronic circuitry or a programmable read only memory microprocessor (PROM).

The function of the conductor status indicator selector 63 is to obtain the conducting status signal from line 60, match it with the indicator identification signal from line 69 and store the results until the next sensing operation is performed on the same fuse at which time the storing means is updated to reflect the most recent sensing test for the particular fuse. This function can be accomplished by appropriate circuitry or by using a programmable read-only memory microprocessor (PROM).

In order to indicate the most recent conducting status of each fuse, a conductor status display 66 contains a visual indicator for each fuse of the brushless exciter rotor 10. These indicators can be lamps or other types of annunciators capable of clearly and unambiguously informing the operator of the conducting status of each fuse.

To relieve the operator of the need to constantly inspect the conductor status display 66, alarm circuitry 72 can readily be connected to the display to sound an alarm upon the occurrence of a nonconducting fuse. It is anticipated that at least two levels of alarm severity will be utilized. First, a single fuse failure can be responded to by merely attracting the operator's attention with an additional lamp or horn. However, the alarm circuitry should be capable of responding to multiple failures (as when an entire phase of fuses fails) by automatically shutting the brushless exciter down completely to prevent further damage. Depending on the brushless exciter application, many such levels of alarm severity can be designed into the alarm circuitry.

Figure 2:
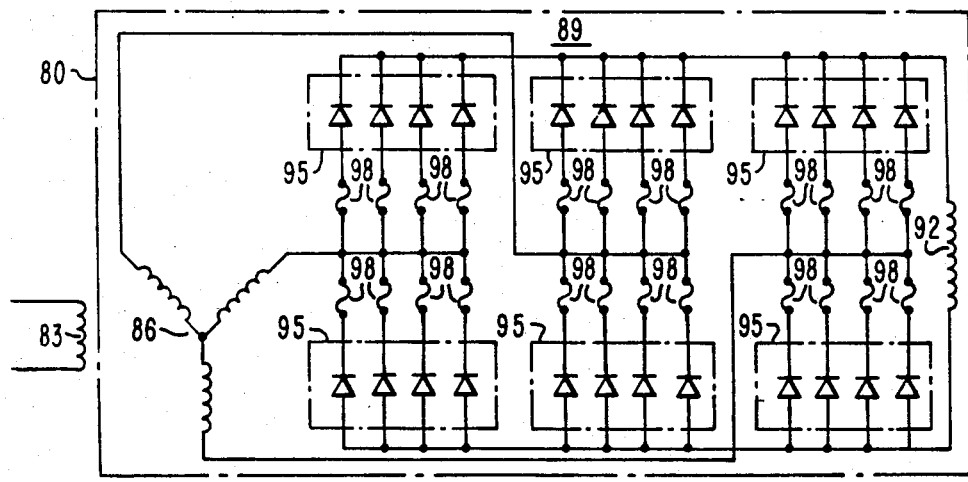
FIG. 2 is a simplified schematic diagram showing a typical brushless exciter system.

In order to more specifically describe the present invention a typical brushless exciter rotor 80 and field winding 83 is shown schematically in FIG. 2. The rotating components are shown enclosed by a dashed outline, including a three-phase armature winding 86, a rectifier assembly 89 and a field winding 92. A stationary direct-current field 83 is supplied within which the armature 86 rotates, generating three-phase alternating current in the three-phase windings shown. The resultant alternating current is rectified by the rotating rectifier assembly 89 thereby applying direct-current voltage to the field winding 92 which is part of the turbine generator rotor. The rectifier circuit consists of at least six diode groups 95, shown in FIG. 2 consisting of four individual diodes arranged in parallel within each diode group. The actual number of these diode groups will depend on the number of phases incorporated in the brushless exciter design. The number of individual diodes within each diode group depends on the current carrying requirement of the specific brushless exciter design. Each individual diode is connected in series with a fuse 98 for protection from overcurrent conditions.

It is apparent from the schematic of FIG. 2 that each diode group 95 will be subjected to a current flow for only 120 degrees of electrical rotation. The total 120 degree conducting angle will be divided into as many smaller equal segments as there are pole pairs in the machine. For example, a six pole pair (12 pole) brushless exciter design will subject each diode element to six conducting paths which are 20 degrees in duration and separated by 40 degrees of nonconducting. This characteristic enables the exact identification of a position of rotation in the middle of one of these conducting segments where each diode is designed to be carrying its maximum current. This position is the most opportune point at which to sense whether the diode is actually conducting a current since it allows the current sensor 21 of FIG. 1 to be set at a low sensitivity level, avoiding possible interference from other nearby conducting elements. Also, since the current flowing through the diodes and fuses is a function of the load applied to the brushless exciter, circuitry can easily be included in the present invention that automatically varies the sensitivity of the current sensors 21 in accordance with the applied load of the brushless exciter in such a way that allows for lower sensitivity levels when higher loads are experienced.

From the foregoing description, it should now be apparent that a new failed fuse detection means has been disclosed that is particularly useful in selectively determining the presence of a nonconducting fuse of a brushless exciter rotor. The novel device disclosed eliminates the need for specially designed rectifier circuits, deliberate operator inspection and a flowing current in parallel with the fuse being tested.

Though the invention has been described with a certain degree of particularity, it is to be understood that the present disclosure has been made only by way of example and that numerous changes in detail, combination and arrangement of components may be accomplished without departing from the spirit and scope of the present invention. For example, in the embodiment described, the sensors 21 are disposed in such a way as to detect current flowing in the fuses 13. Obviously, they could be alternatively positioned to detect a current flow in the diode itself or any other conducting element in series with it. Alternatively, the present invention could be used to check brushless exciters that do not have any fuses as would be applicable to smaller machines. Instead of checking for the presence of current at the proper angular positions, it could be repositioned to check for the absence of short circuit current at angular positions where the fuses are not expected to be conducting current. This method would detect shorted diodes.

It should be apparent from the above discussion that a failed fuse indicator has been provided that requires no special rotor design and that selectively detects the failure of one or more fuses on a brushless exciter rotor. It should also be apparent that although certain illustrative embodiments have been shown and described, the present invention is not so limited that other embodiments and modifications are not possible and that although the invention has been described with reference to fuses of a brushless exciter rotor, the usefulness of the present invention is not so limited and is applicable to any conductor on any desired type of rotating equipment.

What I claim is:

1. A brushless exciter with a failed fuse detector, comprising:
   a rotating member of said brushless exciter;
   a plurality of diodes fixed to said rotating member and arranged in a manner which rectifies alternating current and produces a direct current field for excitation of a turbine generator;
   a plurality of fuses fixed to said rotating member and connected individually in series with each of said diodes;
   a plurality of fixed current sensing means disposed about the circumference of said rotating member proximate to the circular path of said fuses during rotation of the rotating member; and
   means for synchronizing the use of the current sensing means with the rotation of the rotating member to enable the selective determination of the conducting status of each of said fuses, said synchronizing means comprising means for measuring the instantaneous angular displacement of the rotating member and relating that displacement to a reference position of said rotating member.

2. Apparatus for selectively determining the conducting status of a plurality of conductors which are rigidly attached to the circumference of a rotating device, comprising:
   a stationary mark sensing means for remotely sensing a mark on the rotating device and producing a synchronizing signal when the mark proximately passes the mark sensing means;
   an angle position oscillating means for producing output pulses at a preselectable frequency;
   an angle counting means, whose inputs are the binary synchronizing signal and the output pulses of the angle position oscillating means, for producing an output which is a number representing the accumulated number of output pulses from the angle position oscillating means that have occurred since the most recent synchronizing signal, whereby said output number is a measurement of actual angular displacement of said rotating device relative to the angular position where said mark is proximate to said stationary mark sensing means;
   a plurality of current sensing means for remotely sensing an electric current flow in a conductor passing proximate to said current sensing means and producing a binary signal indicative of the conducting status of the conductor, said current sensing means being disposed about the circumference of the rotating device;
   a conductor oscillating means for producing output pulses at a preselectable frequency;
   a conductor counting means, whose input is the output of the conductor oscillating means, for cyclically incrementing a conductor counter from unity to a value equal to the number of said conductors whose conducting status are to be sensed and whose output is a number equal to the value of said conductor counter;
   an angle decoding means, whose input is the conductor number that is the output of the conductor counting means, for determining according to a predetermined scheme the proper angular displacement of said rotating device for sensing the conducting status of the conductor represented by the conductor number, the output of said angle decoding means being a number representative of the proper angular displacement;
   a comparator means for comparing two inputs, the actual angular displacement of the rotating device and the proper angular displacement for sensing the conducting status of the conductor represented by the conductor number, and producing an enabling signal when the two inputs are identical;

a sense coil decoding means, whose input is the conductor number output of the conductor counting means, for determining the proper one of the plurality of current sensing means for sensing the conducting status of the conductor represented by the conductor number, based upon a predetermined scheme, and producing an output which is a number representing the proper one of the plurality of current sensing means;

a current sense coil selecting means, whose inputs are the enabling signal and the output number produced by the sense coil decoding means, for producing an output signal equivalent to the output from the current sensing means represented by the output from the sense coil decoding means when the enabling signal from the comparator indicated an equality between the actual angular displacement and the proper angular displacement for sensing the conducting status of the conductor represented by the conductor number;

a conductor status indicator decoding means, whose input is the conductor number, for producing an output which is a number representing the physical location of the conductor on the rotating device represented by the conductor number;

a conductor status indicator selecting means, whose inputs are the output number from the conductor status indicator decoding means and the conducting status output from the current sense coil selecting means, for retaining the most recent conducting status for each of the plurality of conductors and producing an output representing the conducting status of each of said conductors; and a displaying means for visually indicating the most recent conducting status of each of the plurality of conductors as received as an input from the output of the conductor status indicator decoding means.

3. The rotating device with apparatus of claim 2, wherein:

said current sensing means comprises a device that reacts to the magnetic field created by an electric current and produces a signal proportionate to said electric current.

4. A method for selectively determining the conducting capability status of a plurality of conductors which are rigidly attached to the circumference of a rotating device, said method comprising:

marking a location on said rotating device in such a way that the marked location is able to be detected remotely;

detecting said mark remotely on each revolution of the rotating device when said mark passes a fixed point;

remotely sensing the conducting status of said conductors;

sequentially determining the identity of the one of the plurality of conductors to be monitored during each subsequent revolution of said rotating device;

measuring the incremental angular displacement of the rotating device that has occurred since the most recent detection of the mark on the rotating device;

selecting the one of plurality of sensing means which is a proper position to determine the conducting status of said conductor;

activating the chosen sensing means when said conductor is proximate said sensing means;

synchronizing the rotation of the rotating device with the determining of the conductor and the selecting of the sensory means; and visually displaying the most recent conducting status of each of said conductors.

5. The method of claim 4, further comprising:
activating an alarm when one of said conductors has been sensed to have a nonconducting status.

6. The method of claim 4, further comprising:
shutting down said rotating device when a plurality of conductors have been sensed to have a nonconducting status.

7. The method of claim 4, further comprising:
automatically adjusting the sensitivity of the current sensors so that their sensitivity level varies inversely with the expected current flow through said conductors to minimize interference from conductors adjacent to the selected conductor.

* * * * *